Feb. 13, 1940.  T. T. GOLDSMITH, JR  2,190,020

MOSAIC SCREEN

Filed Nov. 7, 1938    2 Sheets-Sheet 1

INVENTOR
Thomas T. Goldsmith, Jr.
BY
ATTORNEY

Patented Feb. 13, 1940

2,190,020

UNITED STATES PATENT OFFICE 2,190,020

MOSAIC SCREEN

Thomas T. Goldsmith, Jr., Montclair, N. J., assignor to Allen B. Du Mont Laboratories, Inc., Passaic, N. J., a corporation of Delaware Application November 7, 1938, Serial No. 239,326

8 Claims. (Cl. 250—27.5)

My invention relates to improvements in mosaic screens of the type more particularly adapted for television camera tubes.

The object of my invention is the provision of a mosaic screen of the character referred to which has advantages over those proposed heretofore in the way of greater simplicity of construction and method of manufacture, greater uniformity of surface charge, greater effective photosensitive surface, and greater efficiency of operation generally.

Other objects and advantages will hereinafter appear.

By my improved method, there are secured small insulated islands or particles of silver which may be sensitized with oxidation and with caesium to provide a multitude of small discreet photoelectric cells with which to analyze the lights and shadows of a picture into corresponding electrical energy. The same method may be applied in producing isolated particles of materials suitable for producing interference phenomena with light, for example.

This method was developed for use in construction of mosaic screens in a direct pick-up camera tube for television.

In accordance with my invention, mica sheets are coated with emulsion and exposed optically to a regular array or formation of opaque squares. Hardened lines are left after application of a developing solution. Aluminum is evaporated onto the reverse side to form a solid conducting back plate. Silver is next evaporated onto the front surface, covering both the exposed squares of mica and the remaining hardened lines of thin emulsion. Sensitization of the silver is carried out in a manner conventional for photoelectric cells. With the further processing and aging, the emulsion shrinks and cracks up, producing isolation of the silver. The cracking does not actually remove any silver, but simply pulls adjacent edges slightly apart, retaining almost 100% of the surface for photoelectric use. The sensitizing process etches the surface of the silver.

Figure 1:
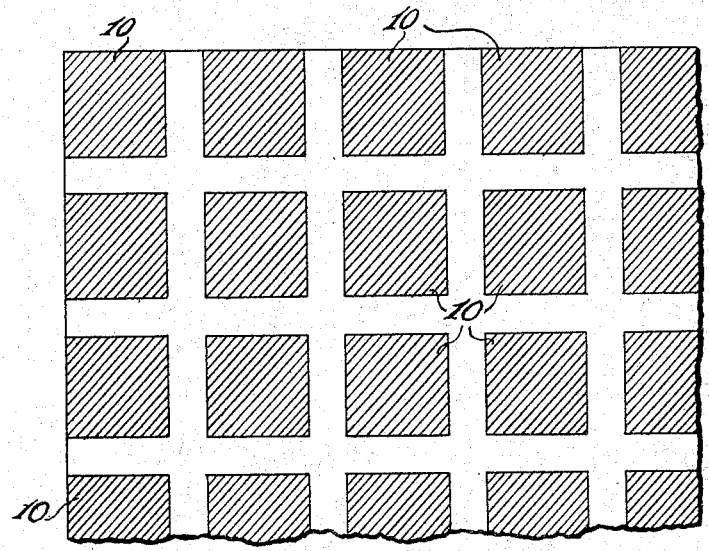
Figure 2:
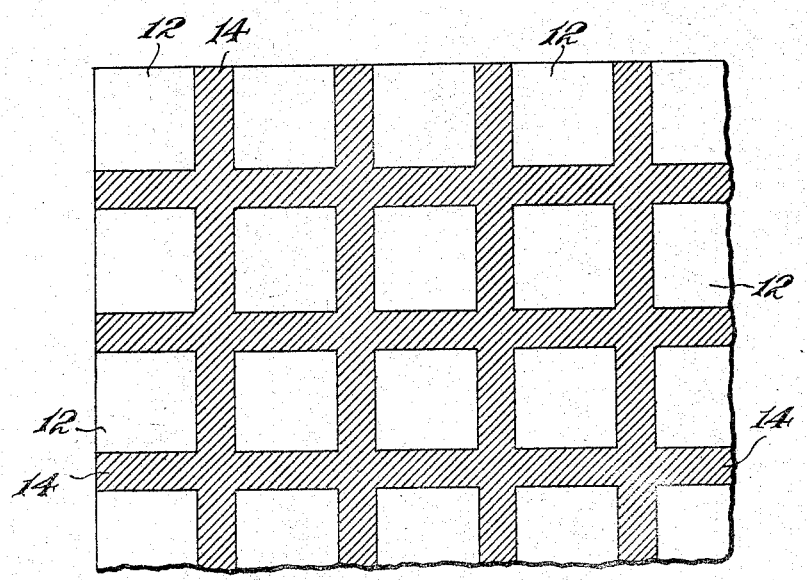
Figure 3:
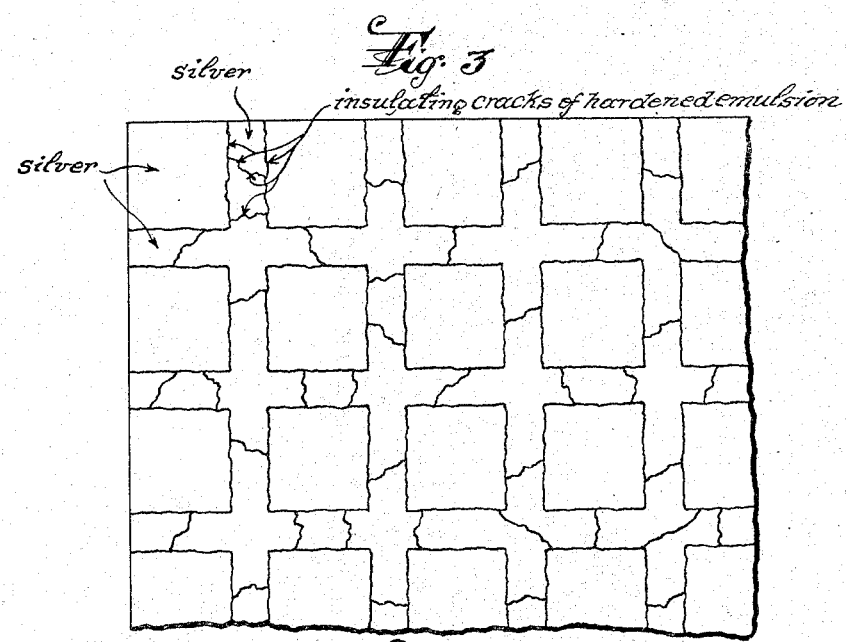
Figure 4:
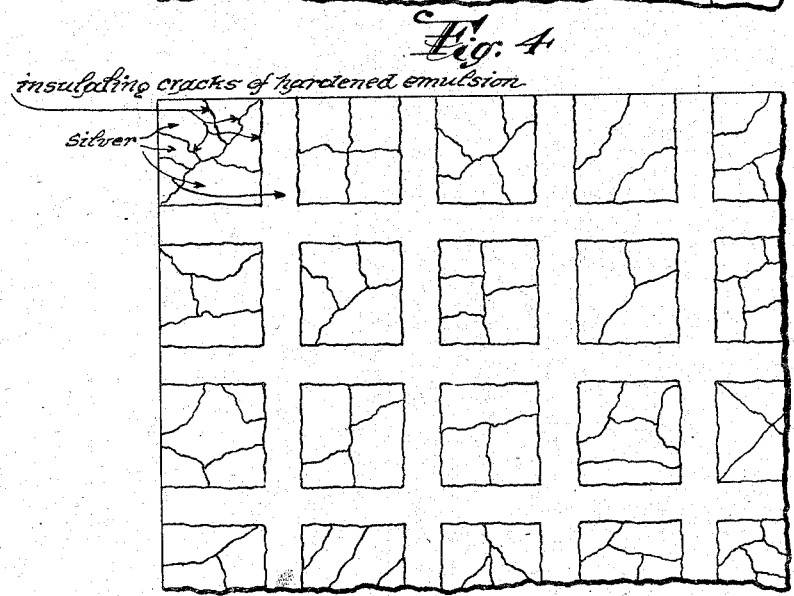
Figure 5:
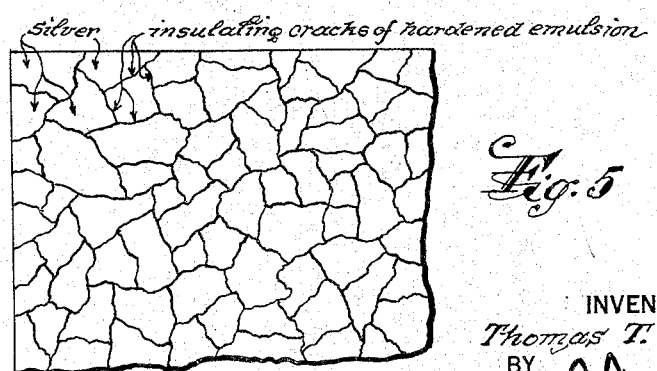

For the purpose of illustrating my invention, an embodiment thereof is shown in the drawings, wherein Figures 1, 2 and 3 are greatly enlarged fragmentary views illustrative of succeeding steps in my improved method; and Figs. 4 and 5 are views similar to Fig. 3, illustrative of some modifications.

The thin sheet of mica, such as a piece 4 inches by 5 inches and .005 inch thick, is cleaned and then roughened slightly. A thin coating of photographically-sensitive emulsion, such as is used in the so-called Pitman Efha deep etch process for lithograph application, is applied to a surface of the mica sheet. This material is an albumen preparation with a green dye. A coating .0005 inch thick is suitable. The emulsion is spun to a smooth uniform coating and allowed to dry.

A screen of opaque squares, represented by the shaded portions 10 in Fig. 1, is placed in contact with the emulsion, or focused optically onto the emulsion. Exposure to light through this screen, and subsequent application of a developing solution hardens the lines, and the developer removes the still soft emulsion under the dark squares of Fig. 1. The resulting surface of the mica is illustrated in Fig. 2, where the portions 12 represent the clean mica and the portions 14 represent the lines of hardened emulsion. The width of the lines 14 may vary considerably with respect to the size of the squares 12, as may be desired, depending partly on the design of the original master screen and partly on the methods of exposure and developing. If contact exposure is used, then a vacuum frame is useful to maintain uniformity of the pattern over the surface.

The next step in the process is to coat the back of the mica, thus providing a solid conducting coating. A liquid gold or liquid silver treatment is suitable, but cleaner results are obtained by evaporating aluminum on the back side of the mica sheet. Silver is next evaporated onto the side having the lines of hardened emulsion, the silver covering the exposed mica squares and the lines of emulsion. A heat treatment then cracks up the emulsion, thus breaking the conducting paths between the silver squares. No specific heating is necessary, as the normal subsequent sensitizing process causes sufficient breaking up or cracking of the emulsion.

Where extreme isolation of the silver in regular islands is desired, the mica may be taken immediately after evaporation of the silver, and subjected to a warm water bath, which entirely removes the emulsion and that portion of the silver deposited thereon, leaving very regular islands of silver similar in appearance to the shaded portions 10 in Fig. 1. However, it is simpler and satisfactory for television applications to utilize the first-mentioned cracking process, obtaining a result illustrated in Fig. 3. This process, furthermore, maintains nearly 100% silver-surface area. The emulsion, in breaking up or cracking, pulls away from the sides of the silver squares deposited directly on the mica, and also cracks form across the emulsion lines, as shown in Fig. 3.

It is possible that satisfactory isolation might be obtained even without optical exposure through the regular screen of opaque squares. Silver is evaporated onto a smooth emulsion surface. Heating produces cracking at random, as represented in Fig. 5, providing sufficient isolation of silver islands or particles. The island size can be controlled by emulsion thickness and processing.

With the screen method, however, the uniformity and size of the islands can better be controlled. Master screen may be obtained having 400 squares to the linear inch, which provides sufficient detail for the highest definition television.

By use of the process of exposure negative to that described above, it is possible to provide on the mica surface isolated islands of silver with conducting strips of silver between, resulting in a screen whereon the space-charge distribution over the screen may be more readily controlled. The emulsion is hardened in the form of isolated squares, with lines of exposed mica between them. The silver is evaporated on the screen, and subsequent treatment cracks the squares and isolates the silver, as illustrated in Fig. 4.

The type of screen illustrated in Fig. 3, however, is best for utilizing the maximum area of sensitive, isolated units. This structure provides the silver surface parallel or nearly parallel to the mica plate or sheet, and reduces reflections to adjacent elements, improving the sharpness of picture contrast when used for television. The surface is of a uniform nature, providing equal sensitivity distribution. The processing is not complex. The method, using different screens, can provide a wide range of definition, using master screens with 10 squares to the inch, or up to master screens with 400 or more squares to the inch.

While the above detailed description specifies mica as the base, the same process may be adapted to prepare isolated islands of silver on other base materials, either insulating or conducting. Also, materials other than silver can be thus secured in isolated particles. Its main application as herein described is for television uses.

The evaporation of the silver onto the mica, on which is the emulsion pattern, may take place either before mounting in the bulb of the pick-up camera tube or else after assembly of the tube. When the prepared silver surface is in place in the tube, it is ready for sensitization. The bulb is evacuated, and oxygen is admitted. A glow discharge is applied to the mosaic surface, etching the silver. Heat treatment by baking, and further glow discharge in oxygen, causes oxidation of the silver surface. Finally, caesium vapor is driven into the bulb from a side tube containing silicon and caesium dichromate. Baking completes the photosensitization, and tin oxide coated on a small area of the glass absorbs the excess caesium. The tube has a cathode-ray gun structure and suitable collector rings. After careful pumping to a high vacuum, the tube is sealed off.

In operation, a picture is focused onto this mosaic, the lights and shadows of which cause respective degrees of charging of the isolated islands or particles by means of their photoelectric emission. A beam of electrons from the gun is made to scan this mosaic surface, playing upon it to produce impulses of electricity proportional to the illumination on the individual particles, as the beam is made to fall on particle after particle. Thus a picture can be analyzed and converted into the corresponding electrical energy for transmission and reproduction at a distant point, as will be well understood.

In my improved method, the cracking or breaking up of the hardened emulsion coating can be caused by a drying process alone, that is, without specific application of heat, and such drying process may take place during evacuation of the tube.

The term "emulsion", as used in the claims is intended to mean any photographically-sensitive emulsion of a kind which, upon application of heat to a hard coating thereof and at a temperature below the fusing temperature of silver, will, without fusing, crack up into isolated and relatively minute and individual particles.

It will be understood that modifications, other than those disclosed, are possible without departing from the spirit of my invention or the scope of the claims.

I claim as my invention:

1. The steps in the method of making a photoelectric mosaic screen of the character described, which consist in application of a coating of a photographically-sensitive emulsion to a surface of a sheet of mica, exposing to light only that portion of the emulsion coating between relatively minute individual and isolated areas of said coating, hardening said portion of the emulsion coating and removing from said areas the emulsion coating to expose the mica surface at said areas, evaporating silver onto the screen structure to cover with silver said exposed areas of the mica surface and said hardened portion of the emulsion coating, heating the screen structure to cause cracking of said hardened portion of the emulsion coating and breaking accordingly of the electrically-conductive paths between the silver-coated areas to produce a silver mosaic, and photosensitizing the silvered surfaces.

2. The steps in the method of making a photoelectric mosaic screen of the character described, which consist in application of a coating of a photographically-sensitive emulsion to a surface of a sheet of mica, exposing to light only relatively minute individual and isolated areas of said coating, hardening the emulsion coating at said areas and removing that portion of the emulsion coating between said areas to expose the mica surface between said areas, evaporating silver onto the screen structure to cover with silver the exposed mica surface and the hardened emulsion coating at said areas, heating the screen structure to cause cracking of the silvered spots at said areas and isolation accordingly of the silver at said areas to produce a silver mosaic, and photosensitizing the silvered surfaces.

3. The steps in the method of making a mosaic screen, said steps consisting in applying a relatively thin layer of a light-sensitive emulsion to a surface of insulating material, exposing said emulsion to light and subsequently developing the exposed emulsion to harden the same, applying a relatively thin layer of electrically-conductive material to the structure, and photosensitizing the electrically-conductive material and cracking up the hardened emulsion to cause isolation accordingly of the photosensitized electrically-conductive material into individual and photosensitive particles over said surface.

4. The steps in the method of making a mosaic screen of the character described, which consist in application of a coating of a photographically-sensitive emulsion to a surface of a base material, exposing to light at least part of the emulsion coating, hardening such part of the emulsion coating, applying a conducting material to said surface to cover the hardened emulsion coating, and cracking up the hardened emulsion coating to produce a mosaic of said second-named material over said surface.

5. The steps in the method of making a mosaic screen of the character described, which consist in applying to a surface of a base a relatively thin coating of a viscous and insulating material, said material being characterized by the fact that subsequent to such application it hardens, applying to said hard coating a relatively thin coating of an electrically-conductive material, and cracking up said first-named hard coating to cause isolation accordingly of said second-named material into a mosaic comprised of relatively minute and individual particles over said surface.

6. The steps in the method of making a photoelectric mosaic screen of the character described, which consist in application of a coating of a photographically-sensitive emulsion to a surface of a sheet of a base material, exposing to light only that portion of the emulsion coating between relatively minute individual and isolated areas of said coating, hardening said portion of the emulsion coating and removing from said areas the emulsion coating to expose at said areas said surface of said sheet, applying a conducting material to the screen structure to cover said exposed areas of said surface and said hardened portion of the emulsion coating with said second-named material, cracking up said hardened portion of the emulsion coating to cause breaking accordingly of the paths between said areas coated with said second-named material to produce a mosaic, and photosensitizing the mosaic surface.

7. The steps in the method of making a photoelectric mosaic screen of the character described, which consist in application of a coating of a photographically-sensitive emulsion to a surface of a sheet of a base material, exposing to light only relatively minute individual and isolated areas of said coating, hardening the emulsion coating at said areas and removing that portion of the emulsion coating between said areas to expose said surface between said areas, applying a conducting material to the screen structure to cover with said second-named material the exposed surface between said areas and the hardened emulsion coating at said areas, cracking up the hardened emulsion coating at said areas to cause isolation accordingly of said second-named material at said areas to produce a mosaic, and photosensitizing the mosaic surface.

8. The steps in the method of making a mosaic screen comprising a base having on a surface thereof isolated particles of a conducting material, said steps consisting in applying to a surface of the base a coating of a photographically-sensitive emulsion, exposing said coating to light and subsequently developing the exposed emulsion coating to harden the same, applying said conducting material in the form of a relatively thin coating thereof to the hardened emulsion coating, and cracking up the hardened emulsion coating to cause isolation accordingly of said material into a mosaic comprised of relatively minute and individual particles over said surface.

THOMAS T. GOLDSMITH, Jr.